United States Patent [19]

Kim

[11] Patent Number: 5,613,768

[45] Date of Patent: Mar. 25, 1997

[54] APPARATUS FOR GENERATING PARALLEL LIGHT USING TWO ARRAYED MIRRORS

[75] Inventor: Dong-ha Kim, Suwon, Rep. of Korea

[73] Assignee: Samsung Electronics Co., Ltd., Kyungki-Do, Rep. of Korea

[21] Appl. No.: 523,393

[22] Filed: Sep. 5, 1995

[30] Foreign Application Priority Data

Oct. 28, 1994 [KR] Rep. of Korea .................. 94-27959

[51] Int. Cl.⁶ .................................................... F21V 7/04
[52] U.S. Cl. ...................... 362/298; 362/301; 362/343; 362/346; 359/613; 359/641; 359/857
[58] Field of Search .................................. 359/613, 641, 359/850, 857, 864, 866, 894; 362/297, 298, 301, 303, 343, 346, 290, 354

[56] References Cited

U.S. PATENT DOCUMENTS

| 1,324,288 | 12/1919 | Wood | 362/301 |
| 1,618,010 | 2/1927 | Hoss | 359/613 |
| 3,494,231 | 2/1970 | Vantine | 359/641 |
| 4,241,389 | 12/1980 | Heimer | 362/346 |
| 5,138,490 | 8/1992 | Hohberg et al. | 359/857 |
| 5,219,445 | 6/1993 | Bartenbach | 362/346 |

*Primary Examiner*—Alan Cariaso
*Attorney, Agent, or Firm*—Sughrue, Mion, Zinn, Macpeak & Seas

[57] ABSTRACT

A parallel light generating apparatus uses two arrayed mirrors. The apparatus includes a parabolic mirror, a lamp located at the focal point of the parabolic mirror, and first and second arrayed mirrors disposed in parallel, each of which is divided into plural portions, with each portion being divided again into parts. A panel is situated between the arrayed mirrors and has a plurality of holes corresponding to each portion of both mirrors, for blocking non-parallel light.

4 Claims, 3 Drawing Sheets

FIG.3A
FIG.3B
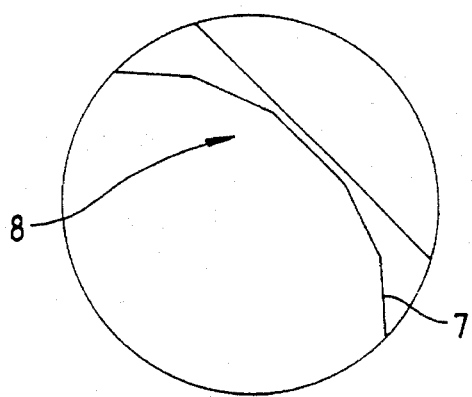
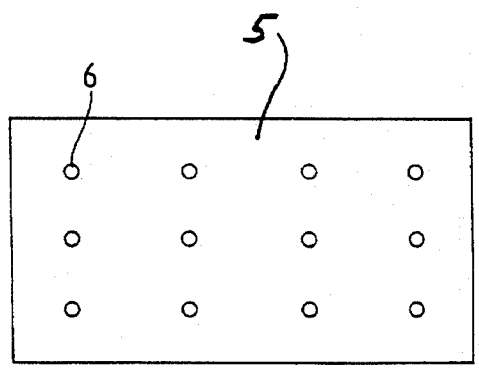
FIG.4
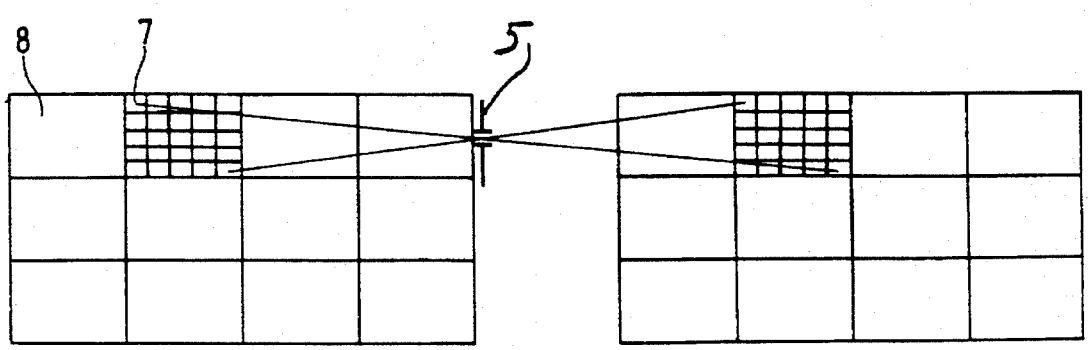

APPARATUS FOR GENERATING PARALLEL LIGHT USING TWO ARRAYED MIRRORS

BACKGROUND OF THE INVENTION

The present invention relates to an apparatus for generating parallel light and, more particularly, to a parallel light generating apparatus which uses two arrayed mirrors.

In general, light may travel either omnidirectionally as from a point source, or as parallel (collimated) light. In the case of point source light, the light intensity (illumination) dissipates exponentially with respect to the distance travelled. On the other hand, parallel light can theoretically maintain its original energy level indefinitely, no matter how far it travels from the source. Therefore, parallel light is desirable for use in optical systems since it exhibits a constantlevel intensity throughout the proceeding path.

Meanwhile, an apparatus for generating a parallel beam of light from a light source generally uses a parabolic mirror to reflect rays emitted from the light source, which proceed as parallel light. In this case however, strictly speaking, there is a small non-parallel light component included in the parallel beam; namely, the rays which emanate directly from the light source proceed in a dispersed manner (represented by the dotted line in FIG. 1). Nevertheless, when parallel light including the nonparallel component travels a certain distance before being manipulated in some way, e.g., is concentrated or dispersed by a lens or other device, there are few problems contributable to the non-uniformity of the light intensity because the quantity of non-parallel light, having been sufficiently dissipated, is negligible.

However, in many optical instruments, a focusing lens is located very close to the lamp (light source), due to the size of the instrument itself. In such a case, the parallel light travels only a short distance before being manipulated, so that the non-parallel light component is still present at a relatively high level and thus acts like an effective component which, due to its non-uniform level, adversely influences the operation of the optical system. If the optical instrument is a projector, the included non-parallel component is projected onto the screen, imparting undesirably shaded areas.

SUMMARY OF THE INVENTION

To solve the above problems, it is an object of the present invention to provide an apparatus for generating parallel light from a light source, which can exclude a non-parallel light component by using two arrayed mirrors.

Accordingly, to achieve the above object, there is provided a parallel light generating apparatus comprising: a parabolic mirror; a lamp located at the focal point of the parabolic mirror and for generating parallel light reflected from the parabolic mirror, as well as non-parallel light; first and second arrayed mirrors disposed in parallel, each of which is divided into plural portions each portion being divided again into parts, the first arrayed mirror disposed to receive the parallel light from the parabolic mirror and the non-parallel light; and a panel being situated between the first and second arrayed mirrors and having a plurality of holes corresponding to each portion of the first and second arrayed mirrors, for passing the parallel light to the second arrayed mirror while blocking the non-parallel light.

In another embodiment of the present invention, a parallel light generating apparatus comprises: a parabolic mirror; a lamp located at the focal point of the parabolic mirror and for generating parallel light reflected from the parabolic mirror, as well as non-parallel light; first and second arrayed mirrors disposed in parallel, each of which is divided into plural portions, each portion being an aspherical concave mirror, the first arrayed mirror disposed to receive the parallel light from the parabolic mirror and the non-parallel light; and a panel being situated between the first and second arrayed mirrors and having a plurality of holes corresponding to each portion of the first and second arrayed mirrors, for passing the parallel light to the second arrayed mirror while blocking the non-parallel light.

BRIEF DESCRIPTION OF THE DRAWINGS

The above objects and advantages of the present invention will become more apparent by describing in detail preferred embodiments thereof with reference to the attached drawings, in which:

FIG. 3A is an enlarged cross-sectional view of portion A shown in FIG. 2;

FIG. 3B is a plan view illustrating a panel having holes;

FIG. 4 is a view illustrating the correspondence between parts in the two corresponding portions of first and second arrayed mirrors.

DETAILED DESCRIPTION OF THE PREFERRED EMBODIMENTS

Figure 1:
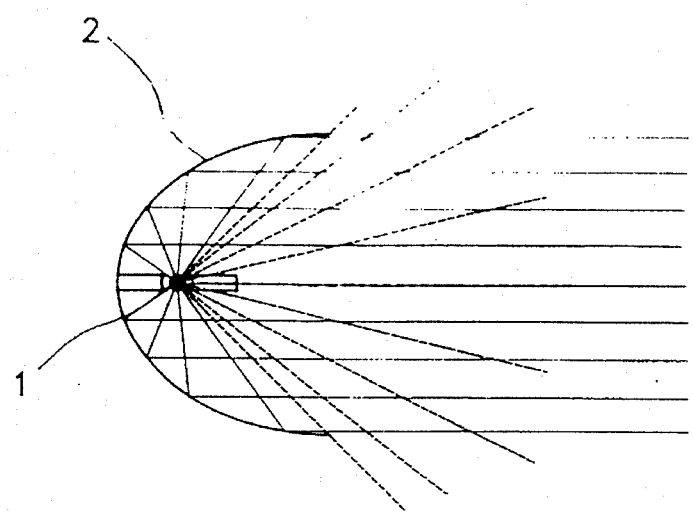
FIG. 1 is a view illustrating the proceeding of non-parallel light when parallel light is produced using a parabolic mirror.
Figure 2:
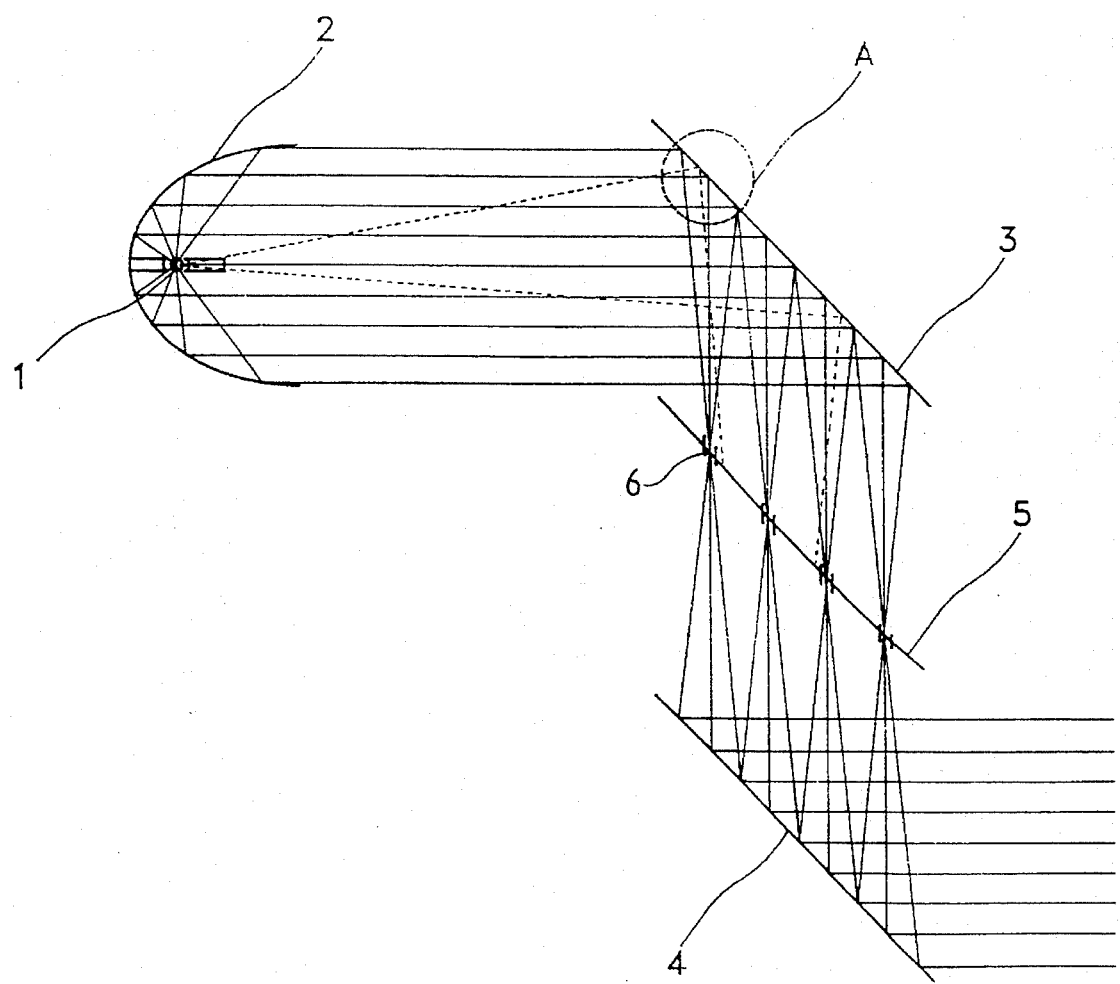
FIG. 2 is a schematic view illustrating an apparatus for a light source according to the present invention.

In FIG. 2, which shows an apparatus for generating parallel light according to the present invention, a lamp 1 as a light source is located at the focal point of a parabolic mirror 2, thereby generating parallel light. Of course, non-parallel light components are unavoidably produced. A first arrayed mirror 3 lies in front of parabolic mirror 2 and is inclined with respect to the optical axis of the parabolic mirror. A second arrayed mirror 4 is located along the proceeding path of the light reflected by first arrayed mirror 3 in parallel with the first mirror and separated therefrom by a predetermined distance. Here, the reflecting surfaces of the arrayed mirrors 3 and 4 face each other, and each arrayed mirror is divided into plural portions, with each portion thereof being divided again into parts. A panel 5 having as many holes as the number of portions in each arrayed mirror is located between the arrayed mirrors, to pass only parallel light components, while blocking the non-parallel light components.

In FIG. 3A, the portion 8 of an arrayed mirror shown as A in FIG. 2 is illustrated in detail. Every portion 8 of either arrayed mirror 3 or 4 has an optically corresponding portion 8 in the other mirror—likewise with the parts 7 constituting the mirror portions 8. Each mirror part 7 has a unique reflecting angle, so that light beams of mirror-portion units can pass in an intersecting and overlapping manner through relevant hole 6 in panel 5. In other words, each mirror portion 8 may be considered as a concave mirror quantized by small planar surfaces (i.e., the individual parts 7 of each portion 8). Here, parallel light rays incident to a given mirror part 7 are reflected in a designated direction, i.e., toward the corresponding part of the other arrayed mirror, and then proceed as parallel light.

FIG. 3B shows a plan view of panel 5. The number of holes 6 in panel 5 is the same as the number of portions 8 constituting either arrayed mirror, and each hole 6 has a corresponding portion 8 on both of arrayed mirrors 3 and 4. Accordingly, the rays reflected from each portion 8 of first arrayed mirror 3 pass through the relevant hole 6, and then proceed to each corresponding portion 8 of second arrayed mirror 4. Here, twelve holes and twelve mirror portions 8 are exemplified, but the hole/portion number is not restricted.

By interposing panel 5 between mirrors 3 and 4, select rays of parallel light pass through holes 6 in panel 5, but most of the non-parallel light is blocked by the panel.

The distance between arrayed mirrors 3 and 4 can be properly adjusted by controlling the reflecting angle of each mirror part 7 With respect to the incident light beam. Panel 5 is situated midway between and parallel to arrayed mirrors 3 and 4. It should be understood that, for the actual positioning of panel 5, each hole 6 thereof is located on the optical path of the central parts of the two corresponding mirror portions 8 of arrayed mirrors 3 and 4.

FIG. 4 illustrates the division of arrayed mirrors 3 and 4. Here, the relation between the corresponding portions 8 is point Symmetry, because all the rays reflected from each part 7 pass through hole 6 in panel 5 and intersect with one another.

Figure 5:
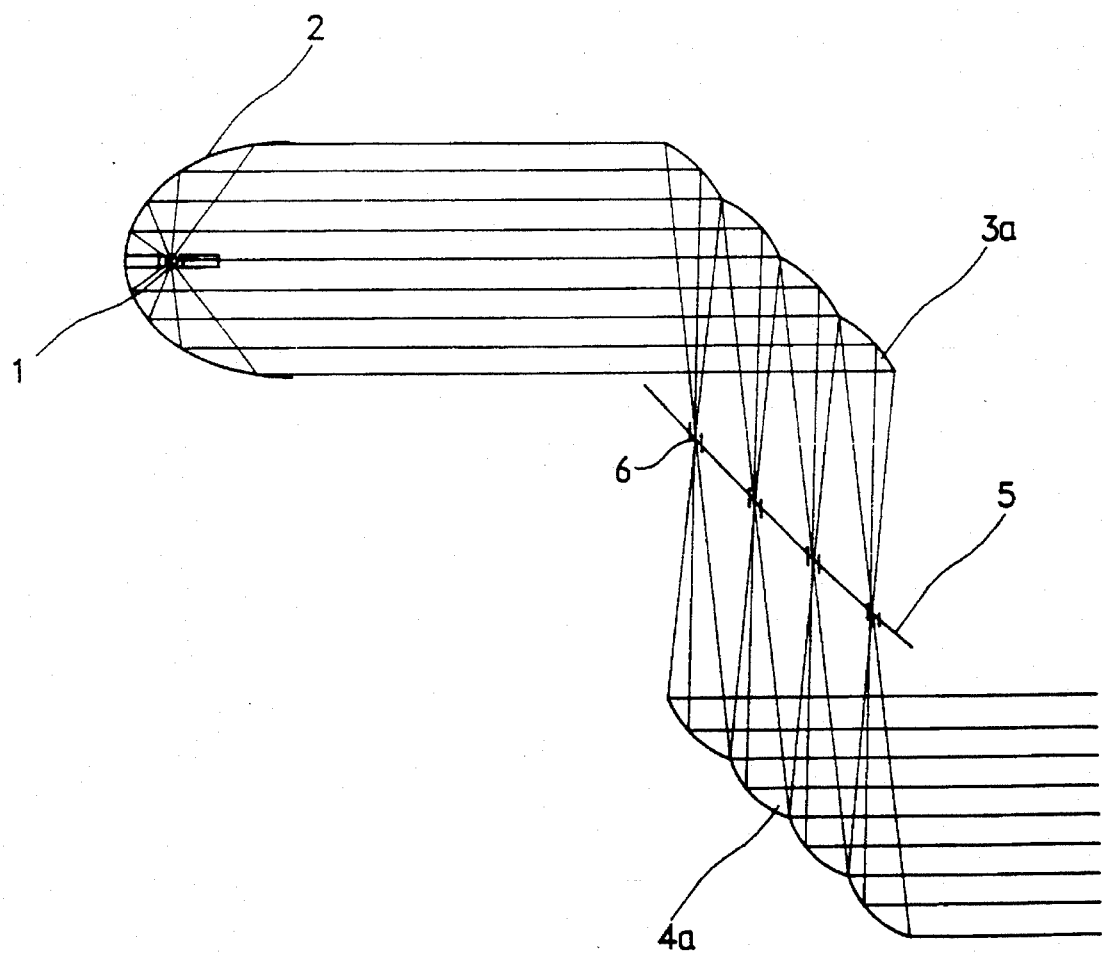
FIG. 5 is a view illustrating another embodiment of the present invention.

FIG. 5 shows an apparatus for generating parallel light according to another embodiment of the present invention. Lamp 1 as a light source is situated at the focal point of parabolic mirror 2, thereby generating parallel light. Naturally, undesired non-parallel light is generated from lamp 1, as well. Of two arrayed mirrors 3a and 4a, first arrayed mirror 3a is located in front of parabolic mirror 2 and is inclined with respect to the optical axis of the parabolic mirror, and second arrayed mirror 4a is located along the proceeding path of the light reflected by first arrayed mirror 3a, in parallel with the first mirror and separated therefrom by a predetermined distance. The reflecting surfaces of arrayed mirrors 3a and 4a face each other. Each arrayed mirror is divided into plural portions 8, with each portion 8 constituted by aspherical concave mirrors. Panel 5 having as many holes as the number of the divided arrayed mirror portions 8 is located between the two arrayed mirrors 3a and 4a, to pass only parallel light components.

Here, the aspherical concave mirror is designed to concentrate parallel light at one point, by reflecting the parallel light. Also, to make the whole surface of the arrayed mirrors arranged with continuously reoccurring portions 8 of the same shape, the concave mirror constituting each mirror portion may have the form of a equilateral triangle, a square, or other regular polygon, when viewed from the optical axis. However, a square is preferred, because, in the case of using a circular concave mirror, a discontinuous section is created between circular portions, and even if the discontinuous section can be occupied by a mirrored surface, the actual manufacture of arrayed mirrors suitable for the invention is difficult.

When a triangular mirror, for example, is used for each portion 8 of both the arrayed mirrors 3a and 4a, since the image on each portion 8 of the first arrayed mirror 3a is inverted, the second arrayed mirror 4a has to be reversely oriented.

From a point of design, there is no need for panel 5 to be located equidistant from arrayed mirrors 3a and 4a. The distance between panel 5 and the second arrayed mirror 4a can be shortened within the limits of not interfering with the optical path by panel 5. Accordingly, the size of each portion constituting the second arrayed mirror should be reduced. (In such a case, however, certain other modifications are necessary.) In doing so, of course, the size of a cross-sectional area of parallel light reflected from second arrayed mirror 4a is also reduced, which is preferable because, in most cases, the volume of an optical device is reduced on condition that the precision of an optical apparatus is not affected. Conversely, by extending the distance between panel 5 and second arrayed mirror 4a, enlargement of the cross-sectional area of parallel light can be obtained. The size of arrayed mirrors 3a and 4a need not be the same. That is, mirrors of the same shape but of different size can be used.

As described above, in an apparatus for generating parallel light according to the present invention, a non-parallel light component being emitted directly from a light source can be excluded so that a parallel light source having uniform intensity is obtained. Such an apparatus, when used for an image-projection apparatus such as a projector, can realize an image of uniform illuminance.

It is contemplated that numerous modifications may be made to the apparatus for generating parallel light of the present invention without departing from the spirit and scope of the invention as defined in the following claims.

What is claimed is:

1. A parallel light generating apparatus, comprising:

a parabolic mirror;

a lamp located at the focal point of said parabolic mirror and for generating parallel light reflected from said parabolic mirror, as well as non-parallel light;

first and second arrayed disposed in parallel, each of which is divided into plural portions, each portion being divided again into parts, the first arrayed mirror disposed to receive the parallel light from the parabolic mirror and the non-parallel light; and a panel being situated said first and second arrayed mirrors and having a plurality of holes corresponding to each portion of said first and second arrayed mirrors, for passing the parallel light to the second arrayed mirror while blocking the non-parallel light.

2. The parallel light generating apparatus as set forth in claim 1, wherein each said part has a regular polygonal shape which forms a solid surface.

3. A parallel light generating apparatus, comprising:

a parabolic mirror;

a lamp located at the focal point of said parabolic mirror and for generating parallel light reflected from said parabolic mirror, as well as non-parallel light;

first and second arrayed mirrors disposed in parallel, each of which is divided into plural portions, each portion being an aspherical concave mirror, the first arrayed mirror disposed to receive the parallel light from the parabolic mirror and the non-parallel light; and a panel being situated between said first and second arrayed mirrors and having a plurality of holes corresponding to each portion of said first and second arrayed mirrors, for passing the parallel light to the second arrayed mirror while blocking the non-parallel light.

4. The parallel light generating apparatus as set forth in claim 3, wherein said aspherical concave mirrors respectively constituting said first and second arrayed mirrors are geometrically similar.

\* \* \* \* \*